(12) United States Patent
Barber

(10) Patent No.: US 8,134,251 B2
(45) Date of Patent: Mar. 13, 2012

(54) WIND TURBINE

(76) Inventor: Gerald L. Barber, Greenville, SC (US)

( * ) Notice: Subject to any disclaimer, the term of this patent is extended or adjusted under 35 U.S.C. 154(b) by 416 days.

(21) Appl. No.: 12/481,817

(22) Filed: Jun. 10, 2009

(65) Prior Publication Data

US 2010/0264662 A1 Oct. 21, 2010

Related U.S. Application Data

(63) Continuation-in-part of application No. 12/426,494, filed on Apr. 20, 2009, and a continuation-in-part of application No. 12/432,837, filed on Apr. 30, 2009.

(51) Int. Cl.
*F03D 9/00* (2006.01)
*F03B 9/00* (2006.01)

(52) U.S. Cl. ............................. 290/55; 290/44
(58) Field of Classification Search .................. 290/43, 290/44, 54, 55
See application file for complete search history.

(56) References Cited

U.S. PATENT DOCUMENTS

| | | |
|---|---|---|
| 717,939 A | 1/1903 | Hernandez |
| 1,015,416 A | 1/1912 | Bennett |
| 1,944,239 A | 1/1934 | Honnef |
| 3,979,619 A | 9/1976 | Whiteley |
| 4,003,676 A | 1/1977 | Sweeney et al. |
| 4,111,601 A | 9/1978 | Richard |
| 4,302,684 A | 11/1981 | Gogins |
| 4,323,331 A | 4/1982 | Schachle et al. |
| 4,330,714 A | 5/1982 | Smith |
| 4,350,895 A | 9/1982 | Cook |
| 4,364,708 A | 12/1982 | David |
| 4,371,346 A * | 2/1983 | Vidal ............................... 440/8 |
| 4,417,853 A | 11/1983 | Cook |
| 4,553,037 A | 11/1985 | Veazey |
| 4,582,013 A * | 4/1986 | Holland, Jr. .................. 114/39.3 |
| 4,619,585 A | 10/1986 | Storm |
| 4,720,640 A | 1/1988 | Anderson et al. |
| 4,729,716 A | 3/1988 | Schmidt |
| 5,299,913 A | 4/1994 | Heidelberg |
| 6,064,123 A | 5/2000 | Gislason |
| 6,091,161 A | 7/2000 | Dehlsen et al. |
| 6,285,090 B1 | 9/2001 | Brutsaert et al. |
| 6,911,741 B2 | 6/2005 | Pettersen et al. |

(Continued)

FOREIGN PATENT DOCUMENTS

EP 0015131 9/1980

(Continued)

OTHER PUBLICATIONS

International Search Report and Written Opinion dated Jul. 2, 2010.

(Continued)

*Primary Examiner* — Nicholas Ponomarenko
(74) *Attorney, Agent, or Firm* — Thomas, Kayden, Horstemeyer & Risley, LLP

(57) ABSTRACT

The wind turbine 20 has sail wings 92 that catch the wind and rotate the turbine wheel 22. The sail wings may be twisted about their longitudinal axis 94 to form pitch and twist in the said wings. A generator is movably positioned in an arc of movement of the turbine wheel and adjusts to the lateral movement of the turbine wheel. Air and liquid cooling is provided to the coils of the rotor and stator of the generator.

10 Claims, 7 Drawing Sheets

U.S. PATENT DOCUMENTS

| | | | |
|---|---|---|---|
| 6,979,171 B2 | 12/2005 | Lauritsen | |
| 7,042,109 B2 | 5/2006 | Gabrys | |
| 7,098,552 B2 | 8/2006 | McCoin | |
| 7,112,010 B1 | 9/2006 | Geiger | |
| 7,154,192 B2 | 12/2006 | Jansen et al. | |
| 7,156,037 B2 | 1/2007 | Borgen | |
| 7,218,011 B2 | 5/2007 | Hiel et al. | |
| 7,228,812 B2 | 6/2007 | Morse | |
| 7,331,762 B2 | 2/2008 | Fraenkel | |
| 7,391,128 B2 | 6/2008 | Rozmus | |
| 7,436,086 B2 * | 10/2008 | McClintic | 290/55 |
| 7,825,532 B1 * | 11/2010 | Barber | 290/55 |
| 2003/0168864 A1 | 9/2003 | Heronemus et al. | |
| 2003/0227174 A1 | 12/2003 | Bayly | |
| 2006/0012182 A1 | 1/2006 | McCoin | |
| 2006/0275121 A1 | 12/2006 | Merswolke et al. | |
| 2007/0024060 A1 | 2/2007 | Bacon | |
| 2007/0166159 A1 | 7/2007 | Williams | |
| 2008/0003105 A1 | 1/2008 | Nies | |
| 2010/0264662 A1 * | 10/2010 | Barber | 290/55 |
| 2010/0264663 A1 * | 10/2010 | Barber | 290/55 |
| 2010/0264667 A1 * | 10/2010 | Barber | 290/55 |
| 2010/0266407 A1 * | 10/2010 | Barber | 416/85 |
| 2010/0266412 A1 * | 10/2010 | Barber | 416/147 |
| 2010/0295307 A1 * | 11/2010 | Barber | 290/52 |
| 2011/0148115 A1 * | 6/2011 | Roznitsky et al. | 290/44 |

FOREIGN PATENT DOCUMENTS

| | | |
|---|---|---|
| GB | 2 100 688 | 1/1983 |
| JP | 2009-030586 | 12/2009 |
| WO | WO 03/046376 | 6/2003 |

OTHER PUBLICATIONS

International Search Report and Written Opinion dated Jun. 30, 2010.
International Search Report and Written Opinion dated Jun. 15, 2010.
International Search Report and Written Opinion dated Jun. 18, 2010.
International Search Report and Written Opinion dated Jun. 16, 2010.

* cited by examiner

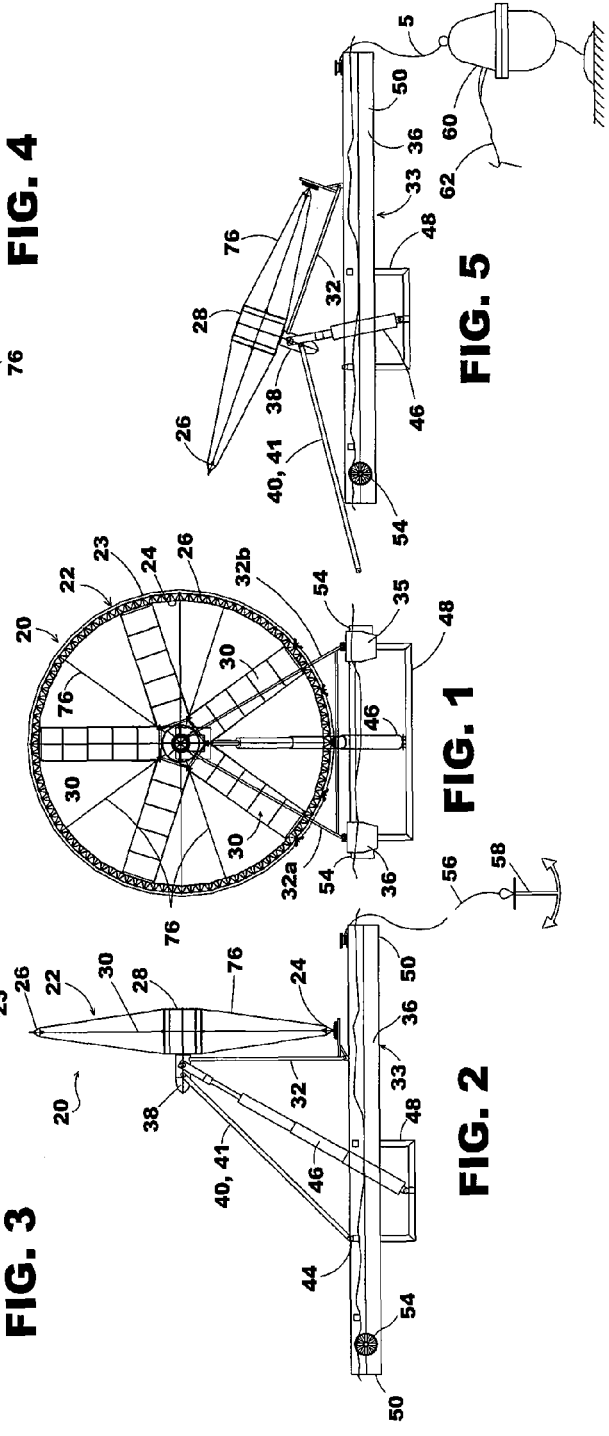

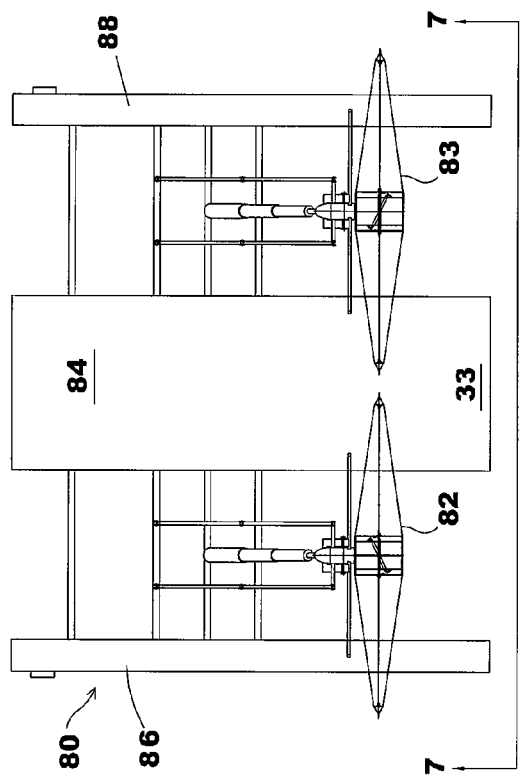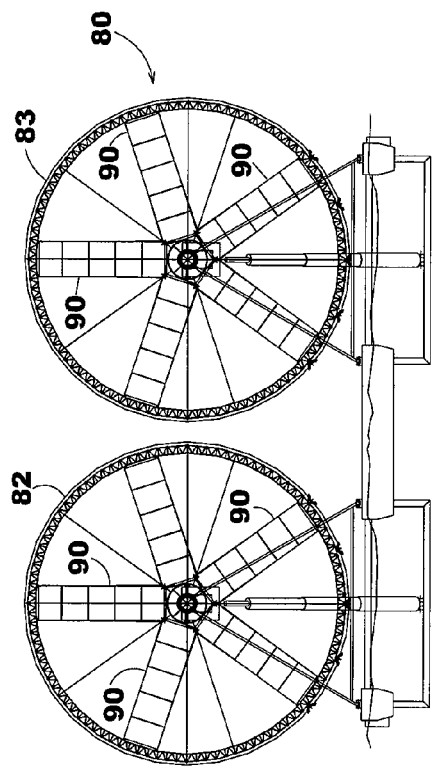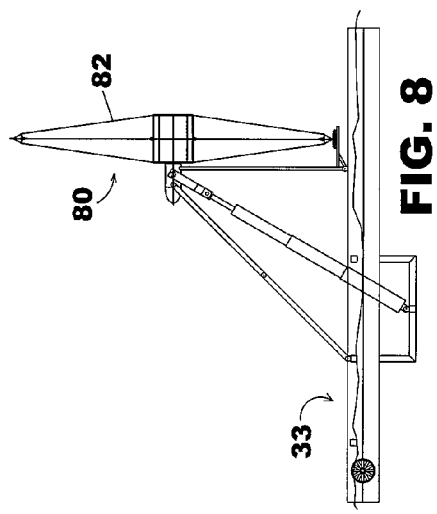

WIND TURBINE

CROSS REFERENCE TO RELATED APPLICATION

This is a continuation-in-part of U.S. patent application Ser. No. 12/426,494, filed on Apr. 20, 2009, and of Ser. No. 12/432,837, filed Apr. 30, 2009.

FIELD OF THE INVENTION

This invention concerns a wind turbine assembly for generating electricity in response to the movement of atmospheric wind.

BACKGROUND OF THE INVENTION

Windmills have been used for many generations for the purpose of pumping water from the ground and for generating electricity. A basic advantage of the windmill is that it uses the power of atmospheric wind to rotate a wheel having radially extending blades. This rotary movement may be converted into various useful purposes. For example, wind turbines in the form of propellers mounted on towers have been placed in areas where steady winds are prevalent and the wind turbines are used to generate electricity.

The blades of the conventional wind turbines are very large and made of expensive rigid material and are constructed to have the blades extend radially from a central hub, with no extra support at the outer tips of the blades. The conventional wind turbine blades rotate at a high rate of revolutions and must withstand both the centrifugal forces generated by the fast revolution of the blades and the cantilever bending forces applied to the blades by the wind. Since the outer portions of the blades move at a very high velocity and are engaged by strong winds, the larger the blades the stronger they must be and the more expensive they become. Thus, there is a practical limit as to the length and width of the blades.

Another type of wind turbine is one that has sail wings constructed of fabric that are a substitute for the rigid blades of the conventional wind turbines described above. For example U.S. Pat. Nos. 4,330,714, 4,350,895, and 4,729,716 disclose wind turbines that use cloth "sails" that catch the wind. The blades of the wind turbine are formed of lighter weight material.

Another wind turbine type has rigid propellers that appear to be rigidly mounted to circular perimeter rims that support the outer ends of the propellers, as shown in U.S. Pat. Nos. 1,233,232 and 6,064,123.

Some of the wind turbines of the patents cited above are constructed with an outer rim that extends circumferentially about the turbine wheel. Rubber tires or other rotary objects are placed in positions to engage the outer rim so as to rotate the rubber tires, with the driven tires rotating the rotor of a generator. Thus, the rotation of the wind turbine is used to generate electricity.

Some of the prior art wind turbines as described above control the rate of rotation of the turbine wheel by turning the turbine wheel at angles with respect to the oncoming wind. Typically, the generators have an optimum speed range in which they operate, requiring the turbine wheel to rotate within a range of revolutions per unit of time. Also, the driving of a generator involves the application of rotary motion to the rotor of the generator and overcoming the drag and frictional forces required to operate the generator.

While wind turbines have found use in open land areas where steady winds are prevalent, the land areas most suitable for catching the wind on wind turbine propeller blades usually are remote from the areas of great need of electrical power. Therefore, there is a requirement that electrical power be transmitted through conductive cables for long distances to the areas of need.

Winds generated over large bodies of water, particularly over an ocean, are not confronted with mountains, buildings, and the vegetation of the land masses that tend to slow the velocity of winds. Also, some of the largest cities of the world are positioned adjacent large bodies of water such as oceans and seas where wind velocities are not slowed near the water surface and are high and predictable. Accordingly, it would be desirable to locate wind turbines on bodies of water spaced relatively close to a land mass where there is a need for electricity. However, the supports for wind turbines usually are connected to the ground surface so that the stability of the wind turbines may be maintained. However, the expense of mounting wind turbines to the bottom of an ocean or other large body of water is expensive and usually is not practical from an engineering standpoint.

SUMMARY OF THE DISCLOSURE

Briefly described, this disclosure concerns a wind turbine assembly for generating electricity that includes a support, a turbine wheel rotatably mounted on the support about a laterally extending central axis, the turbine wheel including a circular rim concentric with and rotatable about the central axis, and an electrical generator in driven relationship with the circular rim.

In one embodiment, a wind driven turbine wheel may be mounted on a floatable support, capable of floating on the surface of a large body of water. The floatable support may include a lateral thruster for turning the wind turbine into the oncoming atmospheric wind.

One of the wind turbine assemblies disclosed herein may include a floatable support, a pair of wind turbines mounted side-by-side on the floatable support and sail wings of one wind turbine each having a pitch opposite to the pitch of the sail wings of the other wind turbine to balance the gyroscopic effects of the wind turbines.

Another feature of a wind turbine assembly may include an anchor tied to the bow of a floatable support and a lateral thruster for moving the stern of the floatable support for turning the wind turbine into the atmospheric wind.

The wind turbine may also include sail wings formed of fiberglass or other relatively flexible material, with shape control means carried by the turbine wheel for rotating at least one of the ends of the sail wings about the longitudinal axis of the sail wings to form a pitch or twist in the sail wings.

Other features and advantages of the structure and process disclosed herein may be understood from the following specification and accompanying drawings.

BRIEF DESCRIPTION OF THE DRAWINGS

FIG. 1 is a front elevational view of a floating wind turbine, showing the turbine wheel in its upright position.

FIG. 2 is a side elevational view of the wind turbine of FIG. 1.

FIG. 3 is a top view of the wind turbine of FIGS. 1 and 2.

FIG. 4 is a top view of the wind turbine of FIG. 1, but showing the turbine wheel tilted in its inoperative position.

FIG. 5 is a side view of the wind turbine of FIG. 4, showing the turbine wheel tilted in its inoperative position.

FIG. 7 is a front elevational view of a double wind turbine, having a pair of wind turbine wheels mounted on a common floatable support.

FIG. 8 is a side elevational view of the double wind turbine of FIG. 6.

FIG. 9 is a top view of the double wind turbine of FIG. 6.

DETAILED DESCRIPTION

Figure 6:
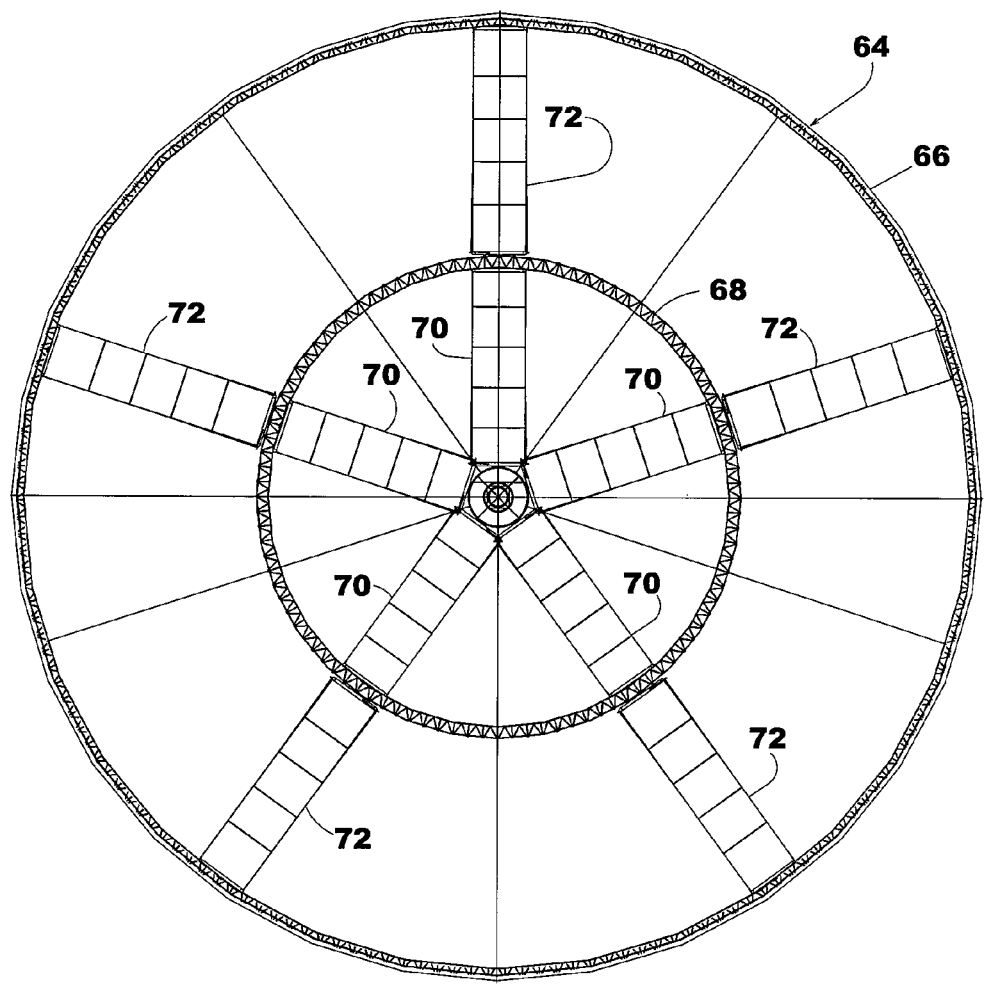
FIG. 6 is a front elevational view of a modified wind turbine wheel, similar to the turbine wheels of FIGS. 1-5, but including an intermediate circular rim that is concentric with the outer circular perimeter rim, with inner sail wings supported between the axle structure and the intermediate support rim and outer sail wings supported between the intermediate support rim and the outer circular perimeter rim.

Referring now in more detail to the drawings in which like numerals indicate like parts throughout the several views, FIG. 1 shows a wind turbine 20 that is designed for catching the wind and rotating for the purpose of generating electricity. The wind turbine includes a turbine wheel 22 having an outer perimeter 23 formed by a series of angle braces 24 and an outer perimeter circular rim 26 that extends continuously about the turbine wheel. The outer perimeter circular rim may be formed of arcuate segments, and as explained in more detail hereinafter, the perimeter rim may function as the rotor of an electrical generator, or may function to drive a rotor of an electrical generator. This is described in more detail hereinafter.

An axle structure 28 is at the center of the turbine wheel 22 and a plurality of sail wing assemblies 30 are mounted to the axle structure 28 and extend radially toward the angle braces 24 that form the perimeter of the turbine wheel.

The wind turbine assembly may be used on a body of water such as an ocean or large lake where the atmospheric wind usually is of higher velocity and more predictable than the atmospheric wind over a land mass. When used on water, the turbine assembly may include a floatable support 33, such as a pontoon boat, barge or other suitable floatable support. The floatable support of FIGS. 1-5 is a pontoon boat having parallel pontoons 35 and 36. The wind turbine assemblies of FIGS. 1-5 include a foldable mast assembly 32 that includes a pair of mast arms 32A and 32B that are connected at their lower end portions to pontoons 36 and 35, respectively, and converging upwardly toward one another in a vertical plane to an upward apex that is in support of the bearing housing 38 at the axial structure 28 of the turbine wheel 22. The mast arms 32A and 32B are foldable about their lower ends to an attitude more horizontal, as shown in FIG. 5, so that the turbine wheel 22 moves more toward a supine position over the pontoons 35 and 36.

Stabilizing arms 40 and 41 are parallel to one another and sloped upwardly from the pontoon boat and are pivotally mounted to the bearing housing 38. The lower ends of the stabilizing arms 40 and 41 are releaseably connected to the cross frames of the pontoon boat, such as cross frame 44. When the turbine wheel 22 is to be tilted toward its supine position, the lower ends of the stabilizing arms 40 and 41 are detached from the cross frame member 44, allowing the turbine wheel 22 to tilt toward its supine position.

Hydraulic cylinder 46 is mounted at its lower end to depending framework 48 and at its upper end to the bearing housing 38. When the hydraulic cylinder 46 is distended, it holds the foldable mast assembly 32 in its upright attitude, allowing the stabilizing arms 40 and 41 to be connected at their lower ends to the cross frame member 44, thereby holding the turbine wheel 22 in its upright position. However, when the stabilizing arms 40 and 41 are disconnected at their lower ends from the cross frame member 44, the hydraulic cylinder 46 may be retracted, causing the turbine wheel 22 to tilt toward its supine position as shown in FIG. 5.

The floatable support 33 of the wind turbine assembly 20 is considered to have a bow at 50 and a stern at 52. The turbine wheel 22 faces the bow 50.

Lateral thrusters 54 are mounted to the pontoons 35 and 36, typically at the stern 52 of the pontoons. The bow 50 is connected by a line or other appropriate means 56 to an anchor 58. The anchor 58 may comprise a pier (not shown), a buoy 60, that generally are not movable from a designated position in the body of water.

When the atmospheric wind moves against the wind turbine assembly 20, the anchor (buoy, pier, etc.) to which the wind turbine assembly is tied stabilizes the bow 50 of the floatable support, usually causing the wind turbine assembly to move downwind of its anchor. In order to assure that the turbine wheel 22 faces the oncoming atmospheric wind, the lateral thrusters 54 shown in FIG. 11 are actuated in response to a wind direction finder (not shown), tending to turn the floatable support and, therefore, the turbine wheel more directly into the atmospheric wind.

Figure 11:
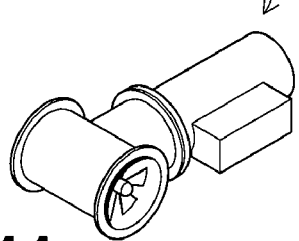
FIG. 11 is a perspective view of a lateral thruster that is mounted to the floatable support of FIGS. 1-8.
Figure 12:
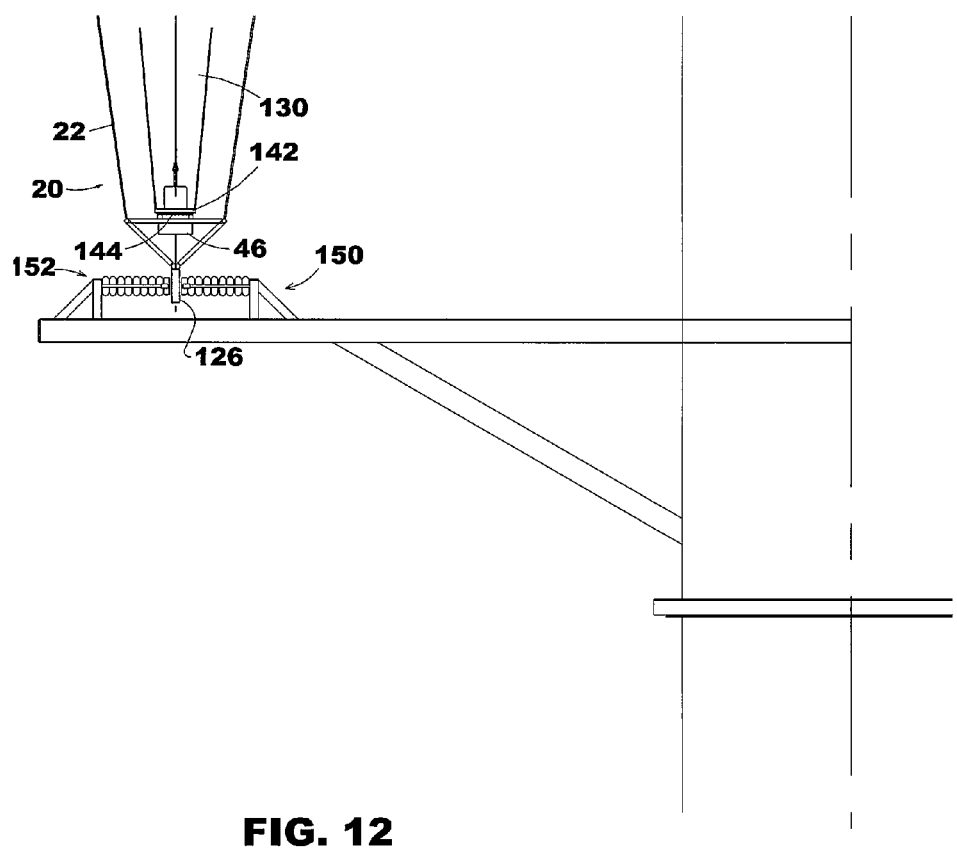
FIG. 12 is a side view of a turbine wheel, the type shown in FIGS. 1-8, but showing more details of the lower portion of the rotor and stator of the wind turbine.

The lateral thruster of FIG. 11 typically is mounted to the stern of the floatable support, as shown in FIGS. 1-5, so that the anchor 58, 60, etc. stabilizes the bow of the floatable support while the lateral thrusters tend to swing the stern in alignment with the bow and atmospheric wind. This assures that the turbine wheel 22 more directly faces the oncoming atmospheric wind, taking advantage of the wind movement through the sail wing assemblies 30, causing efficient rotation of the turbine wheel 22. Lateral thrusters, some times known as "bow thrusters" are conventional in the art and may be found at Mabru Thrusters, Miami, Fla. 33142.

The anchor, such as a buoy, pier or other stationary docking point for the wind turbine assembly includes an electrical connection to the electrical generator of the wind turbine assembly 20 and an electrical conductor 62 to a receiver on an adjacent land mass for transmitting the electrical power generated by the wind turbine assembly.

FIG. 6 shows a modified form of the turbine wheel. Turbine wheel 64 includes an outer rim 66 and an intermediate rim 68, both rims being circular and concentric with the axis of rotation of the turbine wheel. A plurality of inner sail wings 70 extend between the axle structure and the intermediate rim 68, and a plurality of outer sail wings 72 extend between the intermediate circular rim 68 and the outer circular rim 66. The pitch of the outer sail wings 72 typically will be different from the pitch of the inner sail wings 70 since the circular velocity of the outer sail wings is greater than the circular velocity of the inner sail wings. Also, the use of the intermediate circular rim 68 stabilizes the inner and outer sail wings so that the total length of the inner and outer sail wings 70 and 72 may be greater than the length available on a single set of sail wings.

As shown in FIGS. 2, 3 and 5, the axle structure 28 of the turbine wheel is of greater thickness than the circular perimeter rim 26. A plurality of spokes 76 extend from the ends of the axle structure 28 outwardly and converge into supporting relationship with respect to the circular perimeter rim 26. This provides lateral and radial stability to the circular perimeter rim 26.

FIGS. 7-9 show a wind turbine assembly 80 that is a "twin" assembly that includes turbine wheels 82 and 83 that are substantially identical to the turbine wheel 22 of FIGS. 1-5. The floatable support 33 is modified so as to provide a central pontoon 84, with parallel outer pontoons 86 and 88, all pontoons supporting the turbine wheels as described in connection with FIGS. 1-5.

The sail wings 90 of one turbine wheel 82 may be oriented with a pitch so that the atmospheric wind will rotate the turbine wheel in a clockwise direction, whereas the sail wings 90 of the other turbine wheel 83 are oriented at a reverse pitch from that of the turbine wheel 82. This causes the turbine wheels to rotate in opposite directions when facing the oncoming atmospheric wind. This tends to neutralize the gyroscopic effect of the rotation of the turbine wheels of the twin wind turbine assembly 80.

Figure 10:
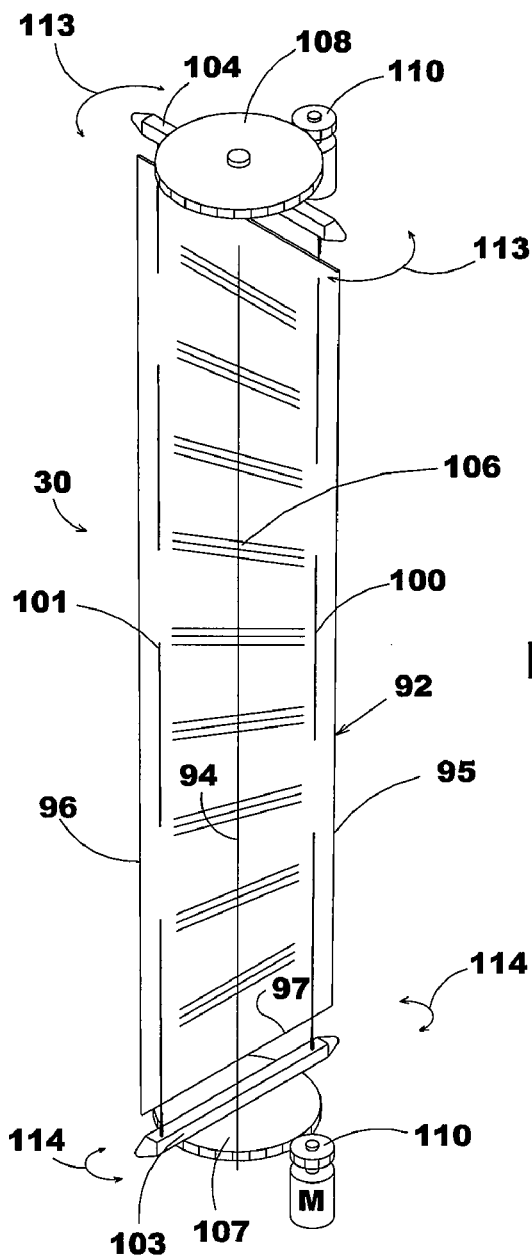
FIG. 10 is an isolated view of one of the wind sails of the wind turbines of FIGS. 1-8.

FIG. 10 shows one of the sail wing assemblies 30. The sail wing assembly includes a sail wing 92 formed of a flexible material, such as sail cloth or thin fiberglass or other material that is able to bend when formed in an elongate shape. The sail wing 92 includes a longitudinal axis 94, opposed side edges 95 and 96, and inner and outer ends 97 and 98. Support cables 100, 101 extend through the sail wing 92 adjacent the opposed side edges 95 and 96, and extend through the inner end and outer end of the sail wing.

Shape control means are positioned at the ends of the sail wing 92. The shape control means includes a laterally extending end support 103 at the inner end 97 of the sail wing 92 and a similar laterally extending end support 104 at the outer end 98 of the sail wing. The laterally extending end supports 103 and 104 are connected at their ends to the support cables. The laterally extending end supports 103 and 104 are rotatable about their mid-lengths which are aligned with the longitudinal axis 94 of the wind sail, as indicated by arrows 113 and 114. The rotation of the laterally extending end supports causes the ends of the cables 100 and 101 to be rotated about the longitudinal axis 94 of the sail wing 92. When the ends of the cables are rotated in the same direction, the sail wings develop a pitch for catching the atmospheric wind. When the cables are rotated in opposite directions, the sail wings develop a twist along the length of the sail wing.

The material of the sail wing 92 can be made stronger or weaker at different intervals along its length, typically by reducing the density of the material of the sail wing in certain areas. This allows the sail wing to twist more at the weakened areas than at the stronger areas. For example, the area designated at 106 is a weakened area so that when the outer end 98 is turned with respect to the inner end 97, the sail wing is twisted. The sail wing tends to twist more in the weakened area 106 than in its strong areas, allowing for a variable pitch to be formed along the length of the sail wing.

As shown in FIG. 10, the laterally extending end support 104 at the outer end of the sail wing is connected to slewing ring 108 that is connected in turn to the angle braces 24 (FIGS. 1-5) at the perimeter rim of the turbine wheel, and a motor driven gear 110 may engage the slewing ring and control the rotary movement of the laterally extending end support 104. A similar laterally extending end support 103 is connected to a slewing ring 107 at the inner axle structure 28, and the motor driven gear 111 may function to rotate the laterally extending wing support 103.

With this arrangement, the slewing rings 107 and 108 and the laterally extending end supports 103 and 104, and the support cables 100 and 101 function as shape control means for adjusting the pitch and twist of each of the sail wings. The shape control means may function to impart a longitudinal twist to the sail wings.

As shown in FIGS. 1, 2 and 5, at least one electrical generator 150 is positioned at the lower arc of the circular perimeter rim of the turbine wheel. The rotary movement of the circular perimeter rim is used to develop electrical power.

One type of electrical generator 150 is illustrated in FIGS. 12-15 of the drawings. The outer perimeter circular rim 126 of the turbine wheel 22 functions as the rotor of the generator. A stator assembly 152 is mounted at the perimeter of the turbine wheel 122 and is positioned to receive the outer perimeter circular rim 126 that functions as the rotor of the generator. The rotor 126 is formed in arcuate segments about the perimeter of the turbine wheel, and each arcuate segment of the rotor includes its own coils 160.

Figure 15:
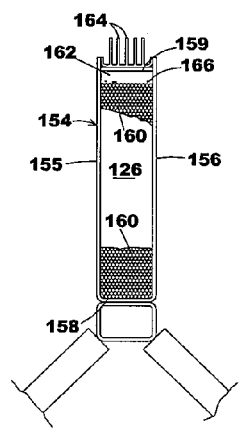
FIG. 15 is a cross-sectional view of the rotor inverted from FIG. 4.
Figure 14:
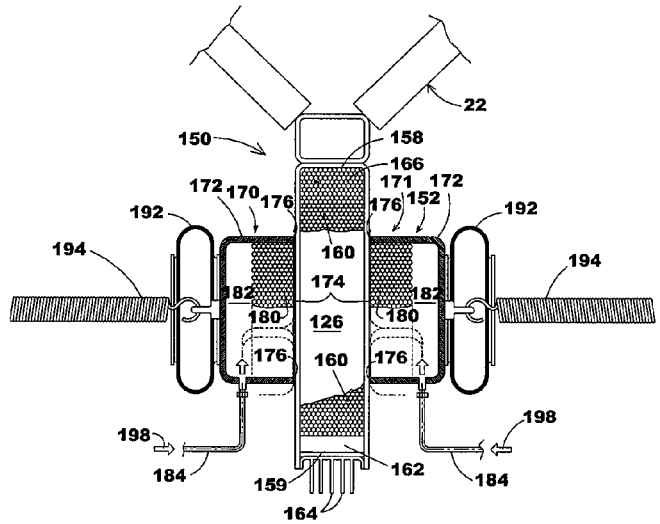
FIG. 14 is a close-up, cross sectional view of a portion of the rotor and stator of the electrical generator of FIGS. 12 and 13, showing the outer perimeter rim of the turbine wheel that functions as a rotor of the generator at the bottom of its circular path, and showing the central portion of the stator.

As shown in FIG. 15, the rotor segments each include the closed housing 154 having flat opposed side walls 155 and 156, inner end wall 158 and outer end wall 159. The electrical coils 160 are positioned in the closed housing with a space 162 formed between the coils 160 and the outer end wall 159. Cooling fins 164 extend from the outer end wall 159 for strength and for the purpose of extracting heat from the rotor 126. Also, a cooling liquid, such as oil 166, occupies some of the space about the coils 160. The cooling liquid 166 may not completely fill the inside of its rotor segment, leaving a space inside the rotor segment. As the turbine wheel rotates, the segments of the rotor 126 will be inverted with FIG. 14 showing a segment of the rotor at the lower arc of its rotation, and FIG. 15 showing a segment of the rotor when it is passing over the upper arc of its rotation. The cooling liquid 166 is influenced by gravity and by centrifugal force to move within the interior of the rotor 126, making contact with the coils and with the interior facing surfaces of the opposed side walls 155 and 156 and the interior facing surfaces of the inner end wall 158 and outer end wall 159. This tends to transmit the heat of the coils to the walls of the rotor, so as the rotor moves away from and then back toward the stator, the cooling fins 164 and the external surfaces of the walls of the rotor tend to shed their heat.

As shown in FIG. 14, stator 152 includes stator halves 170 and 171 that are positioned on opposite sides of the path of the rotor 126 as the rotor rotates on the turbine wheel 122. Stator halves 170 and 171 may be substantially identical and each includes a substantially cup-shaped stator housing 172 having its opening 174 facing the opposed side walls 155 and 156 of the rotor 126. The edges 176 about the cup-shaped stator housings each have a flat rim facing said rotor, the rims are shaped for forming the air escaping from the stator housings into a film of air between each stator housing and the rotor, such that an air bearing is formed between the stator housings and the rotor. The air bearing reduces the friction between the rotor and the stators.

The coils 180 of the stator halves are maintained in juxtaposition with the rotor 126 by the stator housings 172.

A space 182 is formed in the cup-shaped stator housing behind the stator coils 180, with the space forming an air passage for the movement of air through the coils of the stator. An air conduit 184 communicates with the space 182 of each stator housing 172 to supply air to the air passage 182 behind the stator coils 180 so that the air moves from the air source 198 and through the air passage 182 through the stator coils 180, cooling the stator coils. After the air moves through and about the stator coils the air passes between the flat face of the rotor 126 and edges 176 of the cup-shaped stator housing 172. As the air passes the edges 176 of the cup-shaped stator housings 172, the air forms an air bearing between the stator housings 172 and the facing surfaces of the rotor 126. The air moving from the edges of the stator housings forms the air bearing against the flat facing surface of the rotor 126 that assures that the stator housings will not frictionally engage the surfaces of the rotor.

The turbine wheel may be of very large diameter, in excess of 100 feet in diameter. When the turbine wheel of such great size is rotated, it is likely that the rotor segments 126 will not follow exactly the same paths, such that the rotor segments may experience a lateral wobbling motion as they move through the stators, and/or move shallower or deeper into the stator assembly 152. Because of the likelihood of this movement, it is desirable to have the stator move laterally in response to the lateral motions of the rotor, and it is desirable to have the rotor built with a height that is greater than the height of the stator so that the stator can always be in the electrical field of the coils of the rotor.

Figure 13:
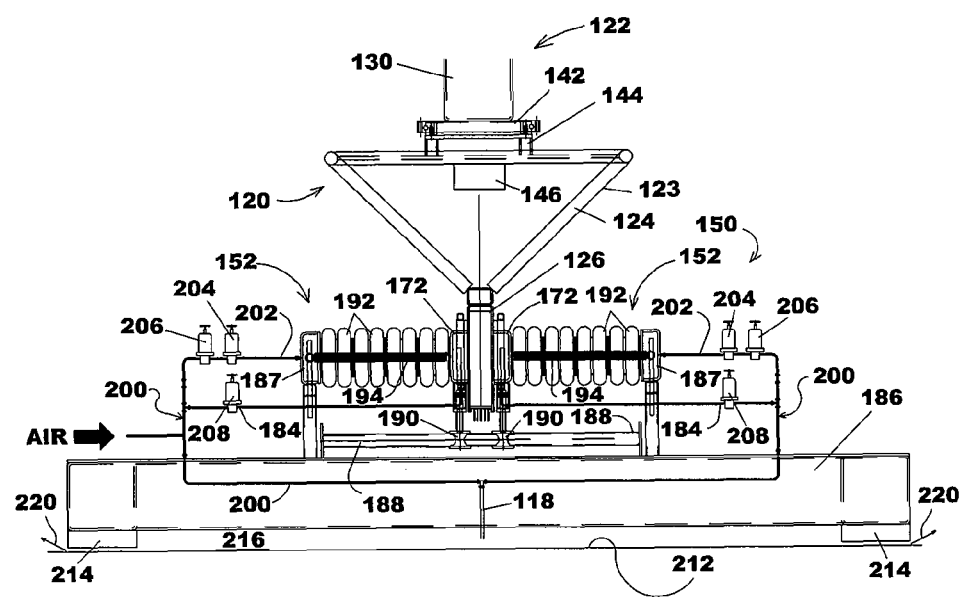
FIG. 13 is a side elevational view of the electrical generator of FIG. 11, showing more details of the electrical generator.

As shown in FIG. 13, in order to accommodate the likely lateral motion of the rotor 126, the stator assembly 152 includes a support platform 186, with a support frame having stator support rims 188 mounted on the support platform. The stator housings 172 are mounted on the support rims 188 by means of rollers, such as rollers 190 that may travel along the stator support rims 188. Inflatable bellows 192 are positioned on the closed sides of the stator housings 172. The bellows 192 are in the shape of air bags connected at one end each to a stator housing 172 and supported at the distal ends by the support frame 187 of the stator. When the bellows 192 are inflated, they urge the stator housings 172 toward engagement with the rotor 126, with the air bearing at the edges of the stator housings helping to avoid the stator housings from contacting the rotor. Equal pressures are maintained in the inflatable bellows 192 on both sides of the stator housings so that when the rotor moves laterally, the bellows tend to urge the stators in the same lateral direction of movement of the rotor. Thus, the air bags function as a first biasing means engaging said stator housings for urging said stators toward said rotor.

In order to assure that the stators will relieve their force toward the rotor at times when the generator is to be deactivated, coil tension springs 194 extend from the lateral support structure 187 to the stator housings 172, tending to urge the stator housings away from the rotor. Thus, the springs function as a second biasing means engaging said stator housings for urging said stators away from said rotor.

FIG. 13 illustrates the air supply system for the stator assembly 152. An air supply device of conventional design (not shown) communicates with the air conduit system 200. The air flows to the inflatable bellows 192 through conduits 202 at opposite ends of the stator, through an air pressure regulator 204, and an air pressure release valve 206, to the series of bellows 192. The air pressure to the bellows is regulated by the air pressure regulators 204 to apply the stator housings 172 toward the rotor 126, with equal pressure applied to the bellows on both sides of the rotor.

Air pressure relief valves 206 function to discharge the air from the bellows 192 when the air pressure drops below a predetermined value. This allows springs 194 to move the stator housings away from the rotor when air pressure is depleted.

Likewise, the air pressure control valves 208 control the movement of air through conduit 184 to the stator housings 172 as previously described. This maintains the cooling of the stator coils and establishes the air bearing at the edges of the cup-shaped stator housings with respect to the facing surfaces of the rotor 126.

While it is anticipated that the above described adjustable positioning features of the stator will be sufficient to have the stator housings accurately follow the lateral movements of the rotor, the air from the air source 198 also may be used to form an air bearing between the support platform 186 and its support surface 212. The perimeter of the support platform 186 is formed with a downwardly extending rim 214 that forms a closed space between the bottom surface of the support platform 186 and the upwardly facing surface 212 of the support. Air is moved through the downwardly extending conduit 218 to the space 216, generating enough upward force to tend to lift the support platform, thereby forming spaces beneath the perimeter rim 214 with the movement of escaping air 220. The escaping air 220 forms an air bearing beneath the support platform 186, allowing it to move in lateral directions, following the lateral motions of the rotor 126.

Figure 16:
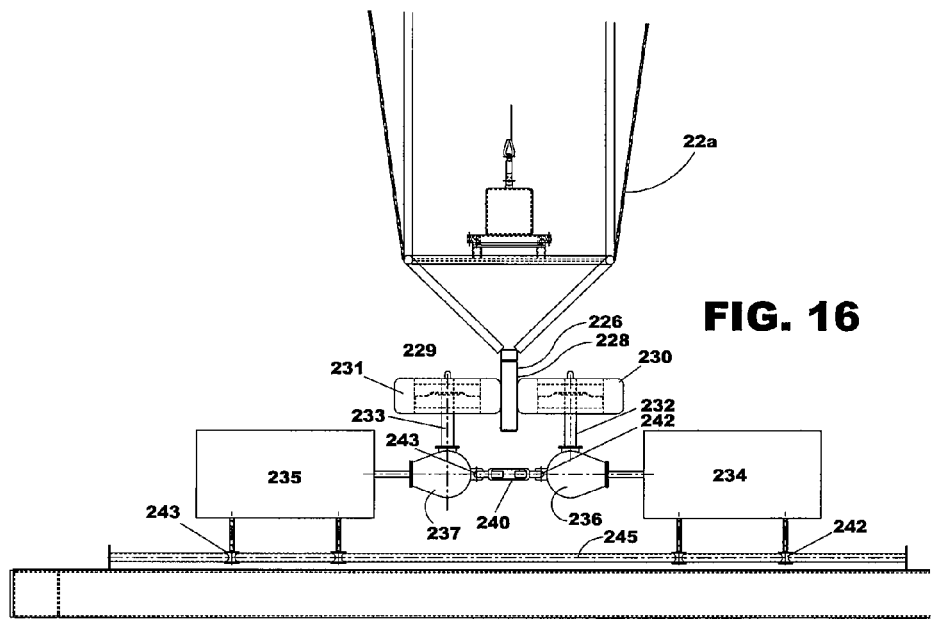
FIG. 16 is a close-up of another detail view of an electrical generator, showing the outer perimeter rim that drives the generator through paired wheels that engage the perimeter rim of the wind turbine.

FIG. 16 shows another type of electrical generator. The perimeter rim 226 of the turbine wheel includes opposed, laterally outwardly facing surfaces 228, 229 that move in unison with the turbine wheel 22A. A pair of rotary members, such as rubber tires 230 and 231 are supported in engagement with the outwardly facing surfaces 228 and 229, respectively, of the perimeter rim 226. The tires are supported on axles 232 and 233, and the axles are connected to the electrical generators 234 and 235, respectively, through gear boxes 236 and 237. Turnbuckle 240 is connected at its opposite ends by bearings 242 and 243 to the axles 232 and 233, respectively. The turnbuckle is tightened so that the tires 230 and 231 make firm and resilient engagement with opposed surfaces of the perimeter rim 226 of the turbine wheel.

The electrical generators 234 and 235 are mounted on wheels 242 and 243, respectively, and the wheels engage rails 245.

It is anticipated that the diameter of the turbine wheel 20A shall be large, in some instances more than 100 feet in diameter. Because of the great size of the turbine wheel and because of slight lateral movement of the turbine wheel induced by intensity and direction of the atmospheric winds, the perimeter rim 226 is likely to move laterally, as well as in its circular path. The arrangement of the support system for the rotary members 230 and 231 is formed so as to compensate for the lateral movement. For example, if the perimeter rim 226 at its lower arc of FIG. 16 moves to the left of FIG. 16, the rotary members 230 and 231, as well as their attached components, including the gear boxes 236 and 237, turnbuckle 240, and electrical generators 234 and 235 are free to move to the left, by the rollers 242 and 243 moving along the rails 245. Likewise, movement to the right is accommodated in the same way.

While the expression "electrical generator" has been use herein, it should be understood that this term may identify other rotary devices that may be driven by the wind turbines disclosed herein, such as alternators, pumps, etc.

It will be understood by those skilled in the art that while the foregoing description sets forth in detail preferred embodiments of the present invention, modifications, additions, and changes might be made thereto without departing from the spirit and scope of the invention, as set forth in the following claims.

The invention claimed is:

1. A wind turbine assembly for generating electricity, comprising:
    floatable support,
    a pair of wind turbines mounted side-by-side on said floatable support,
    each of said turbines of said pair of wind turbines including sail wings that rotate in response to wind moving about said sail wings,
    said sail wings each having a pitch, the pitch of the sail wings of one of said wind turbines being opposite to the pitch of the sail wings of the other of said wind turbines, and
    an electrical generator mounted in engagement with each of said wind turbines for generating electricity in response to the rotation of said wind turbines.

2. The wind turbine assembly of claim 1 and further including a collapsible support for maintaining said pair of wind turbines in an upright attitude suitable for catching the wind and in a supine position for avoiding catching the wind.

3. The wind turbine assembly of claim 2, wherein said collapsible support includes means for maintaining one of said wind turbines in an upright attitude while maintaining the other of said wind turbines in a supine attitude.

4. The wind turbine assembly of claim 1 wherein:
    said wind turbines of said pair of wind turbines each include a circular rim rotatable about a central axis, sail wings supported by said circular rim and extending radially from said circular rim toward said central axis, and
    at least one generator mounted at the circular path of said circular rim and configured to generate electricity in response to the rotation of said circular rim.

5. The wind turbine assembly of claim 4, wherein said generators of said wind turbines include a rotor driven by said circular rim.

6. The wind turbine assembly of claim 5 wherein said rotor is connected to a rubber tire that engages said circular rim.

7. The wind turbine assembly of claim 5, wherein said circular rim is formed as a rotor of an electrical generator, and a stator is mounted in registration with said rotor.

8. The wind turbine assembly of claim 1 and further including an anchor and a line connected between said anchor and said floating support, and said wind turbines facing said anchor.

9. The wind turbine of claim 8, and further including lateral thrusters mounted to said floatable support and arranged to turn said floatable support in the water.

10. The wind turbine assembly of claim 8, wherein said anchor includes a buoy and an electrically conductive cable extending to an electrical receiver for receiving the electricity generated by said electrical generator.

* * * * *